(12) United States Patent
Yoshida

(10) Patent No.: US 9,033,662 B2
(45) Date of Patent: May 19, 2015

(54) HORIZONTAL AXIS WIND TURBINE APPARATUS

(75) Inventor: Shigeo Yoshida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 992 days.

(21) Appl. No.: 13/152,352

(22) Filed: Jun. 3, 2011

(65) Prior Publication Data

US 2011/0299986 A1 Dec. 8, 2011

(30) Foreign Application Priority Data

Jun. 8, 2010 (JP) ................................. 2010-130582

(51) Int. Cl.
*F03D 7/04* (2006.01)
*F03D 7/02* (2006.01)

(52) U.S. Cl.
CPC ............... *F03D 7/024* (2013.01); *F03D 7/044* (2013.01); *F03D 7/042* (2013.01); *F03D 7/0212* (2013.01); *F03D 7/043* (2013.01); *F03D 7/0204* (2013.01); *F03D 7/0224* (2013.01); *F05B 2240/2213* (2013.01); *F05B 2260/901* (2013.01); *F05B 2270/326* (2013.01); *F05B 2270/329* (2013.01); *Y02E 10/723* (2013.01)

(58) Field of Classification Search
CPC ......... F03D 7/042; F03D 7/043; F03D 7/044; F03D 7/0204; F03D 7/0208; F03D 7/0212; F03D 7/024; F03D 7/0224; F05B 2270/326; F05B 2270/329; F05B 2240/2213; F05B 2260/901

USPC ............. 416/1, 10–11, 17, 31, 36, 37, 41, 43, 416/61, 170 R

See application file for complete search history.

(56) References Cited

U.S. PATENT DOCUMENTS

2007/0041837 A1* 2/2007 Ide et al. .......................... 416/61
2009/0068013 A1 3/2009 Birkemose et al.

FOREIGN PATENT DOCUMENTS

| DE | 197 39 162 A1 | 3/1999 |
| EP | 2 154 363 A1 | 2/2010 |
| JP | 2006-307653 | 11/2006 |
| JP | 2007-198167 | 8/2007 |

OTHER PUBLICATIONS

Machine translation of DE 197 39 162, Mar. 4, 1999.*
Extended European Search Report dated Sep. 13, 2012 (Six (6) pages).

* cited by examiner

*Primary Examiner* — Christopher Verdier
(74) *Attorney, Agent, or Firm* — Crowell & Moring LLP

(57) ABSTRACT

A control apparatus C of a horizontal axis wind turbine apparatus WTG calculates the value en of a pitch angle command for each blade based on the rate of change ΨD of the azimuth angle Ψ of a Nacelle N and the rotor azimuth angle of the blades B1, B2 and B3, causes the rotor R to generated torque around the yaw axis by periodically controlling the angle change of the pitch angle of the blades B1, B2 and B3, and using that torque, controls the rate of change of the azimuth angle of the nacelle N. The value of that angle change is calculated as a value that increases as the inputted value of the rate of the change ΨD increases.

4 Claims, 8 Drawing Sheets

HORIZONTAL AXIS WIND TURBINE APPARATUS

CROSS REFERENCE TO RELATED APPLICATIONS

This application claims priority under 35 U.S.C. 119 based upon Japanese Patent Application Serial No. 2010-130582, filed on Jun. 8, 2010. The entire disclosure of the aforesaid application is incorporated herein by reference.

FIELD OF THE INVENTION

The present invention relates to yaw angle control of a horizontal-axis wind turbine apparatus.

BACKGROUND OF THE INVENTION

Typically, a horizontal-axis wind turbine apparatus comprises a rotor to which one, two or more blades are attached radially from a hub, a nacelle which rotatably supports the rotor by means of supporting a main shaft of the rotor which extends in the horizon and to which the hub is fixed, and a tower that supports the nacelle such that there is a free yaw rotation.

When performing operation in which there is the free yaw rotation of a horizontal axis wind turbine apparatus, a large gyro moment occurs in the rotor (blades, main shaft) or the like when the azimuth angle of the nacelle changes rapidly, which may cause damage to the rotor.

Therefore, it is necessary to suppress rapid change in the azimuth angle of the nacelle. The object of an invention disclosed in Japanese Patent Publication No. 2007-198167 is to absorb the yaw rotation of the nacelle with respect to the tower, and applies a resistance torque to the yaw rotation of the nacelle using a viscous oil type rotary damper or the like.

The object of an invention disclosed in Japanese Patent Publication No. 2006-307653 is to prevent damage by reducing the impact load on a horizontal axis wind turbine that occurs due to sudden yaw movement caused by a strong wind or power failure. In other words, when wind blows having a wind speed that exceeds a specified value, or when a power failure occurs, pivoting is allowed toward the downwind side of the nacelle, however, a brake caliper generates a specified braking force (braking force that is 50% of the maximum braking force) for stabilizing the yaw movement toward the downwind side of the nacelle.

However, in the invention disclosed in Japanese Patent Publication No. 2007-198167, a rotary damper is necessary, which increases the manufacturing cost as well as maintenance and inspection of that damper. Moreover, in the case of a rotary damper, the resistance torque that responds to the input is set according to the damper characteristics, so it is not possible to control the size of the resistance torque for a certain input. The rotary damper is located near the axis of yaw rotation of the nacelle, so it is difficult to obtain large input. Therefore, it is also difficult to obtain large resistance torque.

In the technology disclosed in Japanese Patent Publication 2006-307653, attention must be paid to the wear of the brake, and furthermore, a resistance torque is applied to the yaw movement of the nacelle by a certain amount of friction resistance of the brake. Therefore, there is a possibility that there will be a sudden change in the azimuth angle of the nacelle when the friction resistance exceeds the static friction force, and this technology does not have the characteristic of generating a larger resistance torque for faster changes in the azimuth angle of the nacelle, or that of generating a smaller resistance torque for slower changes in the azimuth angle of the nacelle. Consequently, it is not possible to effectively suppress sudden changes in the azimuth angle of the nacelle, and to effectively lessen and absorb impact or vibration.

SUMMARY OF THE INVENTION

Considering the above situation, the purpose of the present invention is to provide a horizontal axis wind turbine apparatus that is capable of effectively suppressing yaw movement of the nacelle as well as effectively lessening and absorbing impact or vibration by causing a resistance torque against the yaw movement of the nacelle according to the rate of change of the azimuth angle of the nacelle without adding special equipment to the basic construction of the horizontal axis wind turbine apparatus for applying a resistance torque to the yaw movement of the nacelle.

According to a first embodiment of the present invention for achieving the purpose described above, there is provided
a horizontal axis wind turbine apparatus comprising:
a main turbine unit supporting a horizontal axis turbine rotatably around a horizontal axis, wherein the horizontal axis turbine has a plurality of blades and rotates around the horizontal axis by receiving wind;
a tower supporting the main turbine unit pivotably in the horizontal direction, and allowing the main turbine unit to pivot in accordance with a direction of wind received by the blades;
a pivoting position detector provided either on the main turbine unit side or on the tower side, for detecting a position of the main turbine unit in its pivoting direction;
a blade rotation angle detector provided on the main turbine unit, for detecting a rotation angle of each of the blades in the rotational direction of the horizontal axis turbine;
a blade pitch angle changing mechanism provided on the main turbine unit, for changing a pitch angle of each of the blades independently in a direction that increases the pitch angle or in a direction that decreases the pitch angle; and a pitch angle controller for controlling the blade pitch angle changing mechanism, based on the position of the main turbine unit in the pivoting direction detected by the pivoting position detector and the rotation angle of each blade detected by the blade rotation angle detector, so as to continuously adjust the pitch angle of each blade while the horizontal axis turbine is rotating;
wherein the pitch angle of each blade is adjusted according to the rotation angle of each blade so that the pitch angle is greater when a horizontal component of a velocity vector of the blade is in a direction opposite to the pivoting direction of the main turbine unit than when the horizontal component of the velocity vector of the blade is in the same direction with the pivoting direction of the main turbine unit.

According to a second embodiment of the present invention for achieving the purpose above, there is provided
the horizontal axis wind turbine apparatus according to the first embodiment, wherein
the pitch angle controller calculates a pivoting speed of the main turbine unit based on a detected result of the pivoting position detector, and controls the blade pitch angle changing mechanism so that an amount of the pitch angle adjustment for each blade becomes greater as the calculated pivoting speed increases.

According to a third embodiment of the present invention for achieving the purpose described above, there is provided
the horizontal axis wind turbine apparatus according to the first embodiment, wherein the pitch angle controller controls the blade pitch angle changing mechanism so that the amount of changing the pitch angle of each blade becomes the maximum when the rotation angle of each blade is around 90 degree or 270 degree, wherein the rotation angle of each blade is defined as 0 degree when it is located at a highest position of the rotation direction of the horizontal axis turbine.

With the present invention, it is possible to effectively suppress yaw motion of the nacelle by suitably calculating and applying a resistance torque that acts against the yaw motion of the nacelle according to the rate of change of the azimuth angle of the nacelle. In other words, as a result, it is possible to effectively suppress a rapid change in the azimuth angle of the nacelle, and thus protect the rotor and the like by effectively lessening and absorbing impact and vibration.

Moreover, with the present invention, the rotor is used as a device that applies a resistance torque against yaw movement. Therefore, the invention has an advantage in that there is no need for special equipment for applying resistance torque against yaw motion of the nacelle to be added to the basic construction of a horizontal axis wind turbine. Therefore, it is possible to apply the invention at low cost to all kinds of independent pitch control type horizontal axis wind turbines, and thus the burden of maintaining and inspecting the mechanical elements is not increased.

Furthermore, the present invention has the advantage of being capable of setting and changing the setting of the resistance torque that is applied against yaw motion of the nacelle according to the rate of change of the azimuth angle of the nacelle without changing any of the mechanical elements.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1A is a side view, FIG. 1B is a rear view, FIG. 1C is a top view and FIG. 1D is a top view after the yaw angle has changed.

DETAILED DESCRIPTION OF THE INVENTION

In the following, an embodiment of the present invention will be explained with reference to the accompanying drawings. The following is just one embodiment of the present invention and does not limit the invention.

Figure 1A:
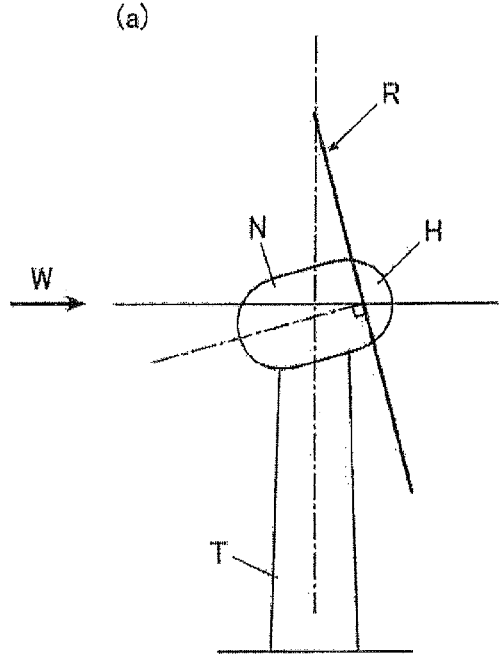
FIGS. 1A to 1D are schematic diagrams of a 3-blade horizontal axis wind turbine apparatus of an embodiment of the present invention, where
Figure 1B:
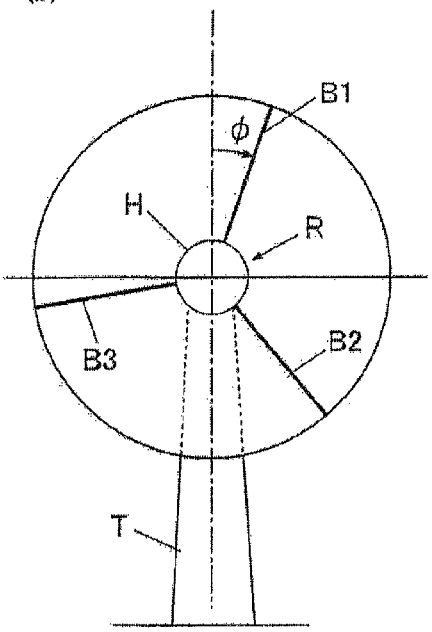

The horizontal axis wind turbine apparatus as illustrated in FIGS. 1A to 1D comprises a rotor R having a hub H to which blades B1, B2 and B3 are attached, a nacelle N that axially supports the rotor R via a main shaft such that it rotates freely, and a tower T that supports the nacelle N such that there is a free yaw rotation. This horizontal axis wind turbine is a downwind type horizontal axis wind turbine, and by the rotor R, which is located further downwind than the tower, receiving wind W, the rotor R rotates. As illustrated in FIG. 1B, $\phi$ is the azimuth angle of the rotor, and is the same as the azimuth angle of the blade B1. This horizontal axis wind turbine has three blades B1, B2 and B3. The blades B1, B2 and B3 each have an azimuth angle, however, the blades B1, B2 and B3 are held by the hub H at known relative angles, so only one azimuth angle of the rotor R needs to be input to a control apparatus.

Moreover, this horizontal axis wind turbine comprises pitch drive apparatuses that change the pitch angles of each of the three blades B1, B2 and B3, and the control apparatus independently controls the three blades B1, B2 and B3 by sending a control signal to each pitch drive apparatus.

Figure 1C:
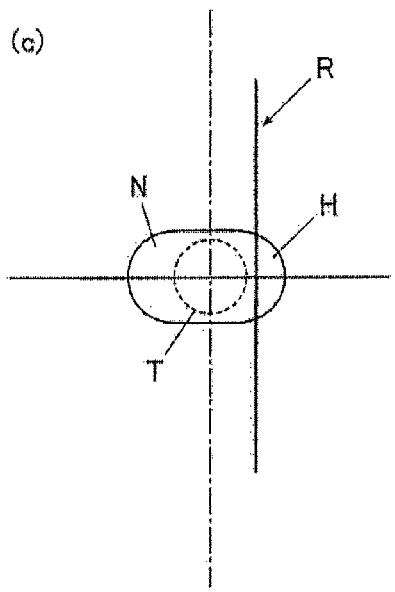

As illustrated in FIG. 1C, $\Psi$ is the azimuth angle of the nacelle.

A wind power generator is constructed by applying this horizontal axis wind turbine.

Figure 2:
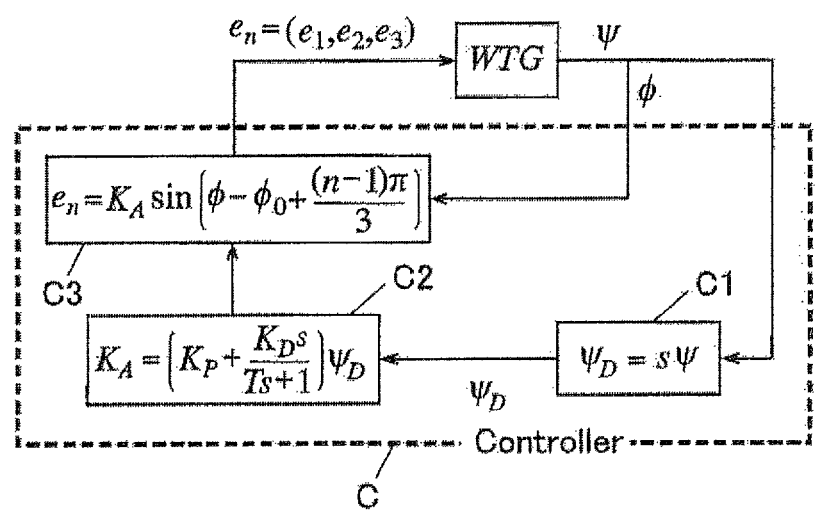
FIG. 2 is a block diagram illustrating an example of control of the embodiment of the present invention.

FIG. 2 is a block diagram illustrating the calculation and control performed by the control device that is installed in the horizontal axis wind turbine. In FIG. 2, WTG is a block that illustrates the entire wind power generator except for the control device C, and includes the main horizontal axis wind turbine unit, various measurement devices, and pitch drive apparatuses for each of the blades B1, B2 and B3. Only the control device C is illustrated in a separate block. The control device C acquires the azimuth angle $\Psi$ of the nacelle and the azimuth angle $\phi$ of the rotor from the measurement devices that are mounted in the wind power generator WTG.

Within a wind speed range that is suitable for power generation, the blades B1, B2 and B3 are uniformly controlled to a pitch angle that causes the rotor R to efficiently rotate. The nacelle N is not fixed but has the free yaw rotation, so the azimuth angle $\Psi$ of the nacelle changes according to operating conditions such as the wind speed, wind direction, rotational speed of the rotor, pitch angle of each of the blades and the like.

Figure 8:
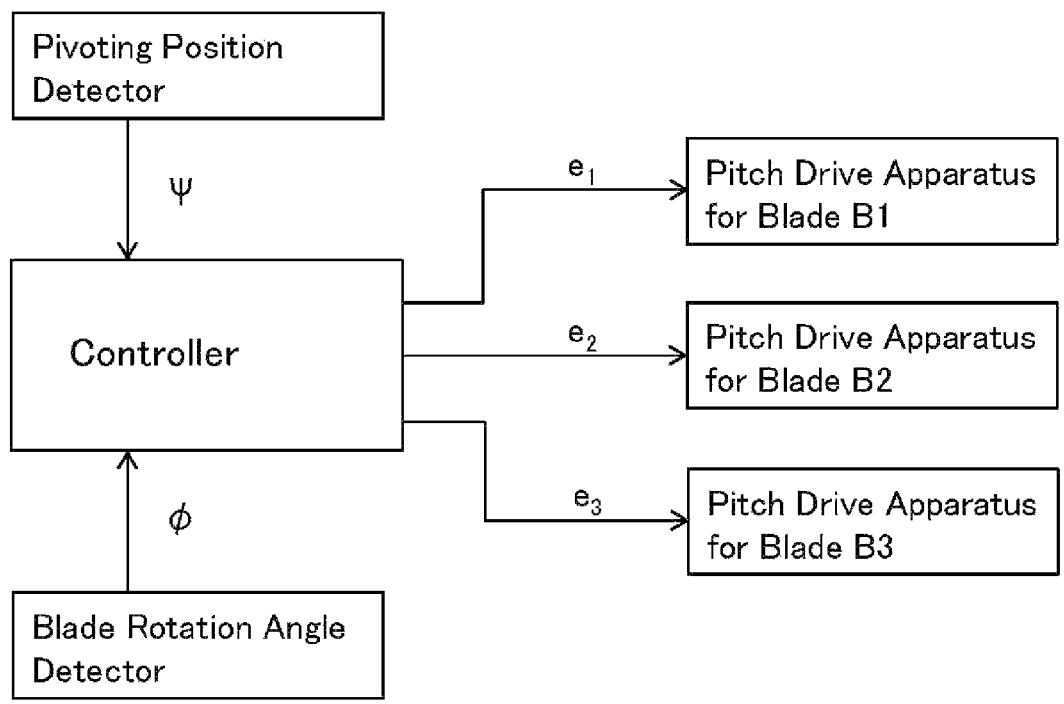
FIG. 8 is a schematic diagram explaining a system for controlling pitch angle of blade in an embodiment of the present invention.

Under such operating conditions, first, based on the azimuth angle $\Psi$ of the nacelle that is inputted from the measurement device "pivoting position detector" illustrated in FIG. 8), the control device C, as illustrated in block C1, calculates the rate of change $\Psi D$ of the azimuth angle $\Psi$ of the nacelle by calculating the time derivative of the azimuth angle $\Psi$ of the nacelle. This derivative calculation can be replaced by pseudo differential calculation. A filter such as a low-pass filter, or band-pass filter is appropriately applied to the input signal (azimuth angle $\Psi$ of the nacelle, azimuth angle $\phi$ of the rotor) of block C1.

Next, the control device C uses the rate of change $\Psi D$ that was calculated in block C1 to perform calculation according to the equation illustrated in block C2, and calculates the angle gain KA.

The control device C then uses the angle gain KA that was calculated in block C2 and the azimuth angle $\theta$ of the rotor that was inputted from the measurement device ("blade rotation angle detector" illustrated in FIG. 8) to perform calculation according to the equation illustrated in block C3, and calculates pitch angle command values en (=e1, e2, e3) for each of the blades B1, B2 and B3 according to PD control, then outputs the values to the corresponding pitch drive devices as shown in FIG. 8.

For example, for this horizontal axis wind turbine, by performing the calculation processing above, when the nacelle N is under a yaw rotational behavior, the dynamic lift of each of the blades B1, B2 and B3 become opposite extreme values at phases where the azimuth angles of the blades become ±90 degrees. Moreover, control is performed so that around the axis of yaw rotation of the nacelle N, the torque generated by the rotor R acts in the direction opposite the direction of change of the azimuth angle of the nacelle N. In other words, according to change direction of the azimuth angle of the nacelle, the blades move to the upwind or downwind side. Of these, for the blades that move to the upwind side, control is performed to set the pitch angle to the fine side (pitch angle of 0°) in order to further increase lift, and for blades that move toward the downwind side, control is performed to set the pitch angle to the feather side (pitch angle of 90°) in order to further decrease the lift. Therefore, the pitch angle of each of the blades B1, B2 and B3 become an extreme value in front of the azimuth angle of 90 degrees and in front of azimuth angle of 270 degrees of the blade.

Figure 1D:
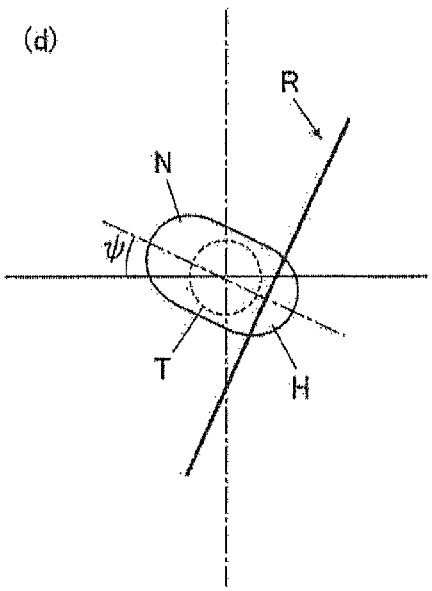

For example, when the nacelle N is under a behavior of rotating in the clockwise direction as illustrated in FIG. 1C to 1D, the torque from the rotor R is inputted to the nacelle in the counterclockwise direction in FIGS. 1C and 1D, and suppresses the rate of change of the azimuth angle of the nacelle.

Similarly, when the nacelle is under a behavior of rotating in the counterclockwise direction as illustrated in FIG. 1D to 1C, the torque from the rotor R is inputted to the nacelle in the clockwise direction in FIGS. 1C and 1D, and suppresses the rate of change of the azimuth angle of the nacelle.

The amount of change of the pitch angles of each of the blades B1, B2 and B3 is calculated according to the increase in the rate of change of the azimuth angle Ψ of the nacelle N, and the calculated values increase in accordance with the increase in the rate of change of the azimuth angle.

Therefore, it is possible to effectively suppress yaw movement of the nacelle N, as well as to effectively lessen and absorb impact and vibration.

In this embodiment, it is possible to reduce the rate of change of the azimuth angle of the nacelle without adding equipment such as rotary dampers or hydraulic yaw motors. As a result, there is also an advantage in which it is possible to reduce the weight of the rotor (blades and main shaft).

[Simulation]

In the following, a simulation that was performed for checking the effect obtained by applying the present invention will be described.

The horizontal axis wind turbine that is the object of this simulation is constructed according to the embodiment above. Furthermore, in this simulation, the wind turbine was a downwind wind turbine of which the rotor diameter was 70 m, the tilt angle of the rotor was 8 degrees, the coning angle of the rotor was 5 degrees, and the rated output was 1.5 MW.

Figure 3:
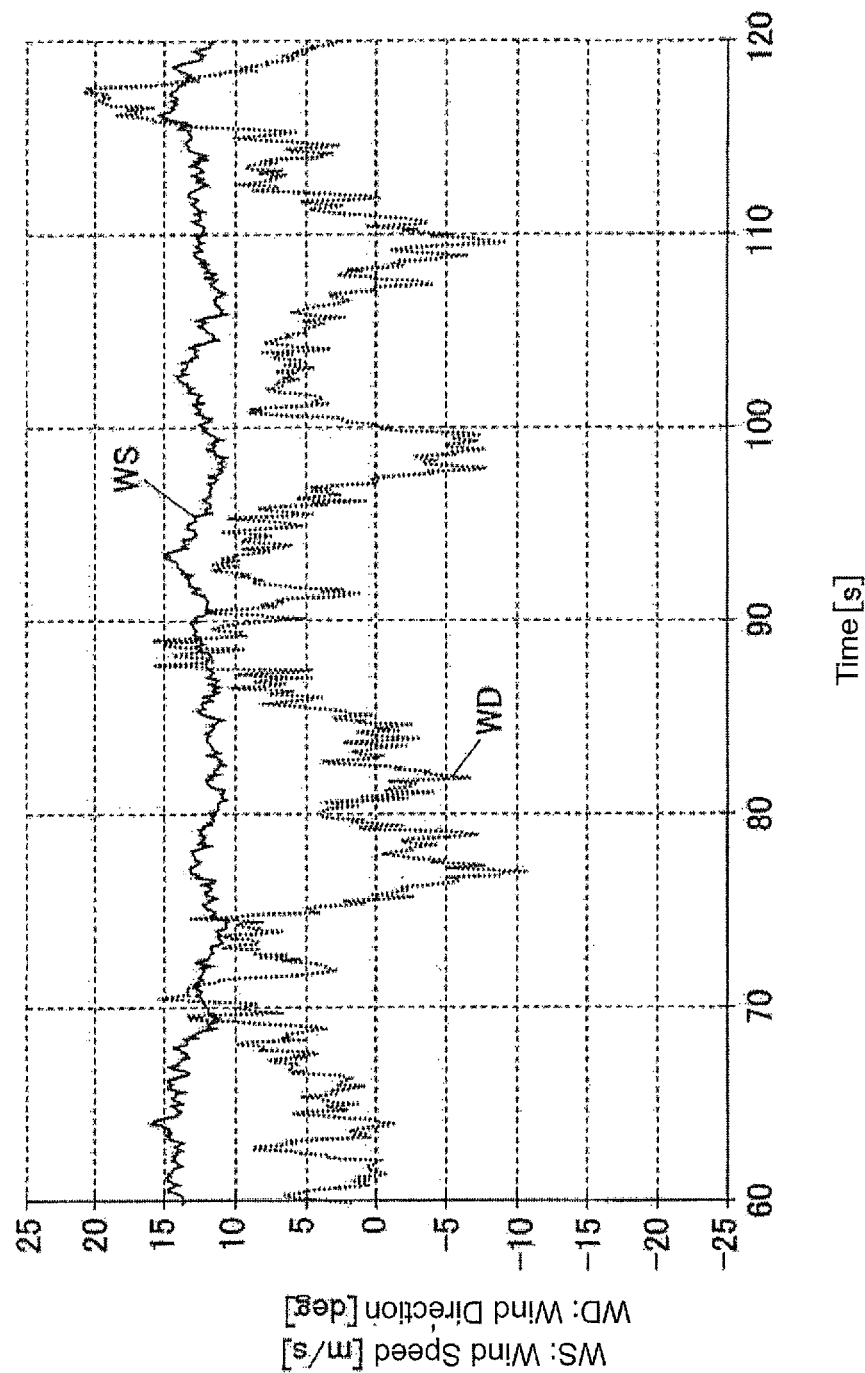
FIG. 3 is a graph illustrating change in the wind speed WS and wind direction WD near the hub to which simulation is applied in order to check the effect of the present invention.

Under wind conditions as illustrated in FIG. 3 simulation was performed that executes the control illustrated in FIG. 2.

Figure 4:
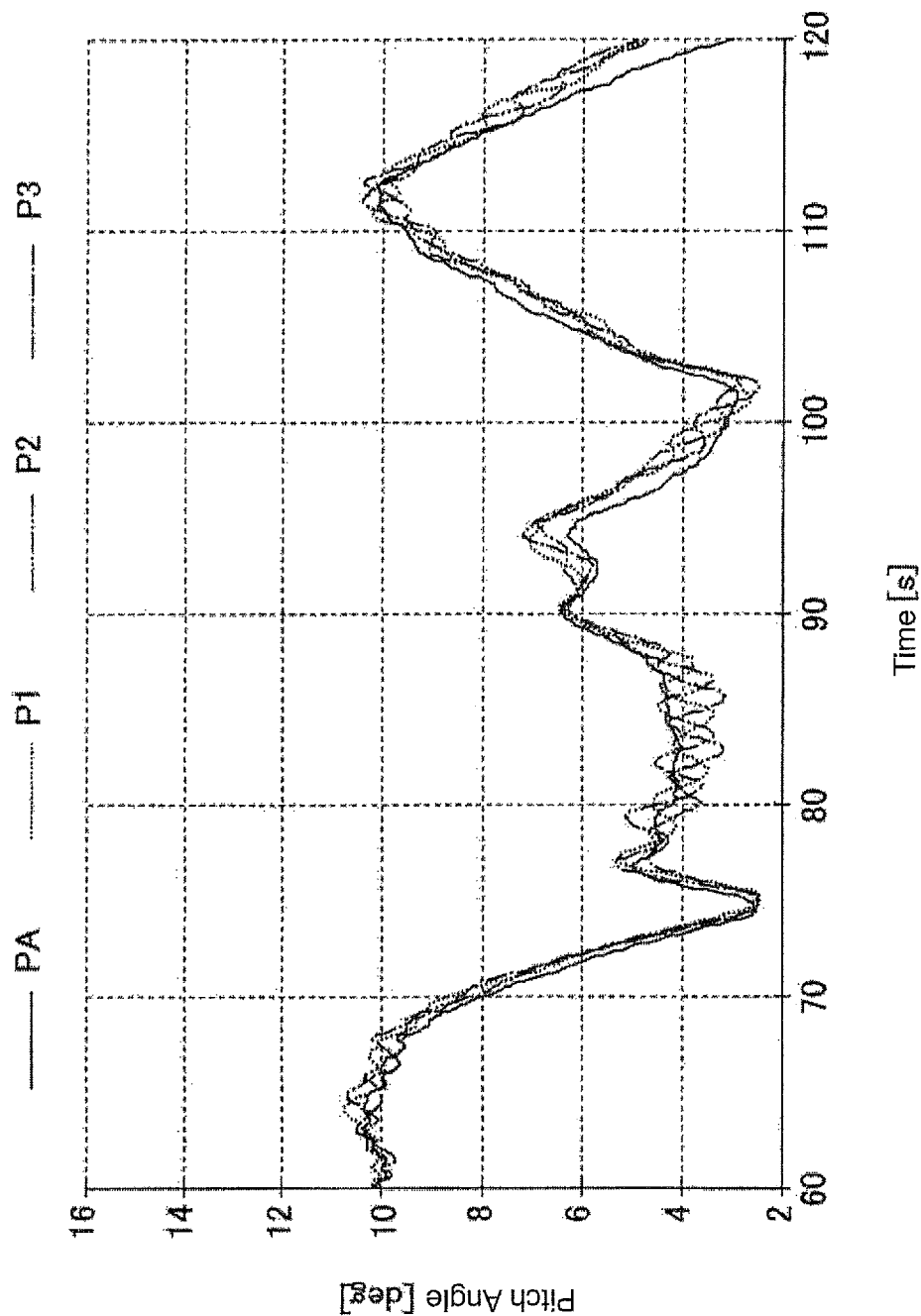
FIG. 4 is a graph illustrating the change in the pitch angle of the blades, where P1, P2 and P3 illustrate the change in pitch angle of each blade when control of the present invention is applied to a simulation, and PA illustrates the change in the pitch angle of all of the blades when control of the present invention is not applied.

The change in pitch angle of the blades B1, B2 and B3 by this control was as illustrated by P1, P2 and P3 in the graph in FIG. 4.

Figure 5:
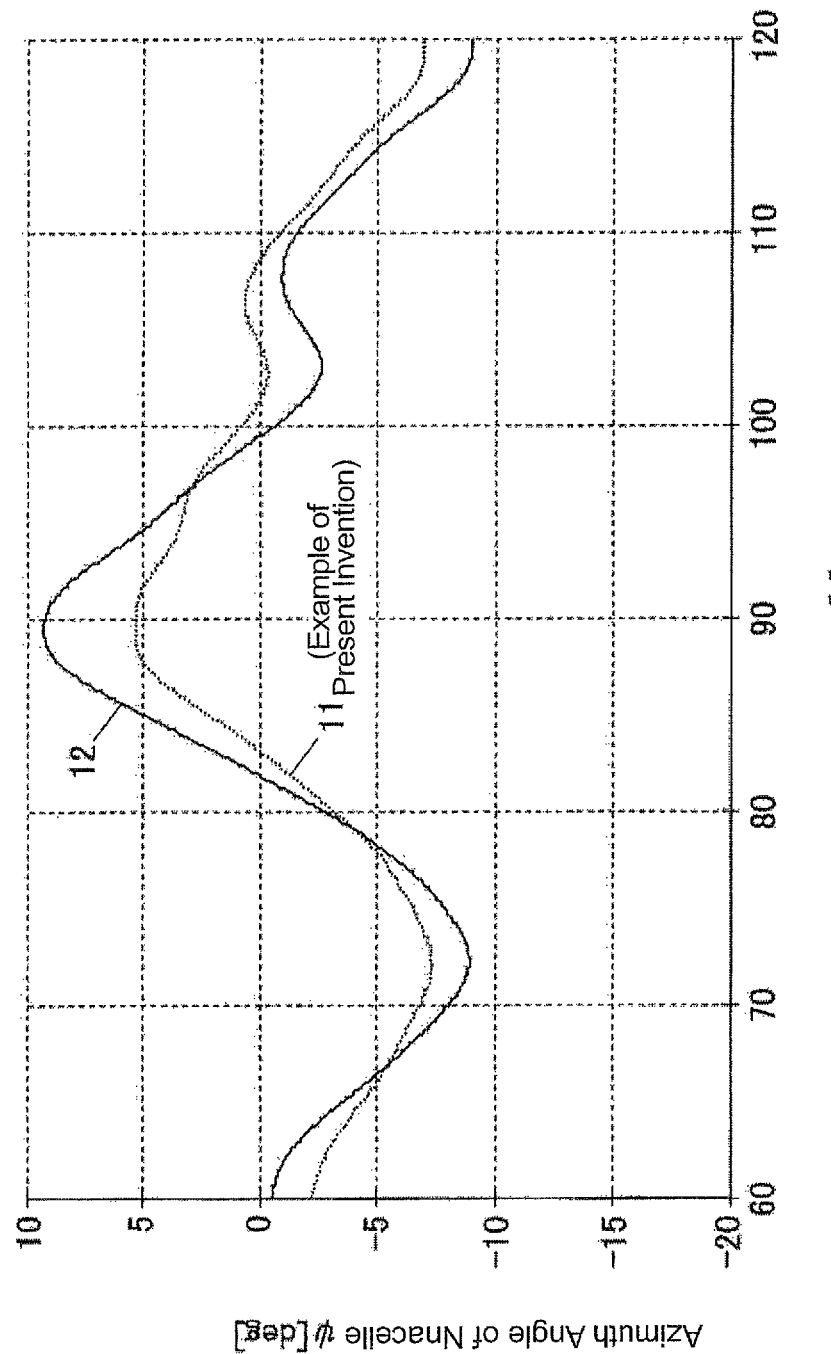
FIG. 5 is a graph illustrating the change in azimuth angle of the nacelle, and compares the simulation effect of applying and not applying the control of the present invention.

As illustrated in FIG. 5, it can be seen that change in the azimuth angle of the nacelle was suppressed by this control, and by this control, the amplitude of the line 11 in the graph is kept small when compared with the line 12 in the graph for the case in which this control was not applied.

Figure 6:
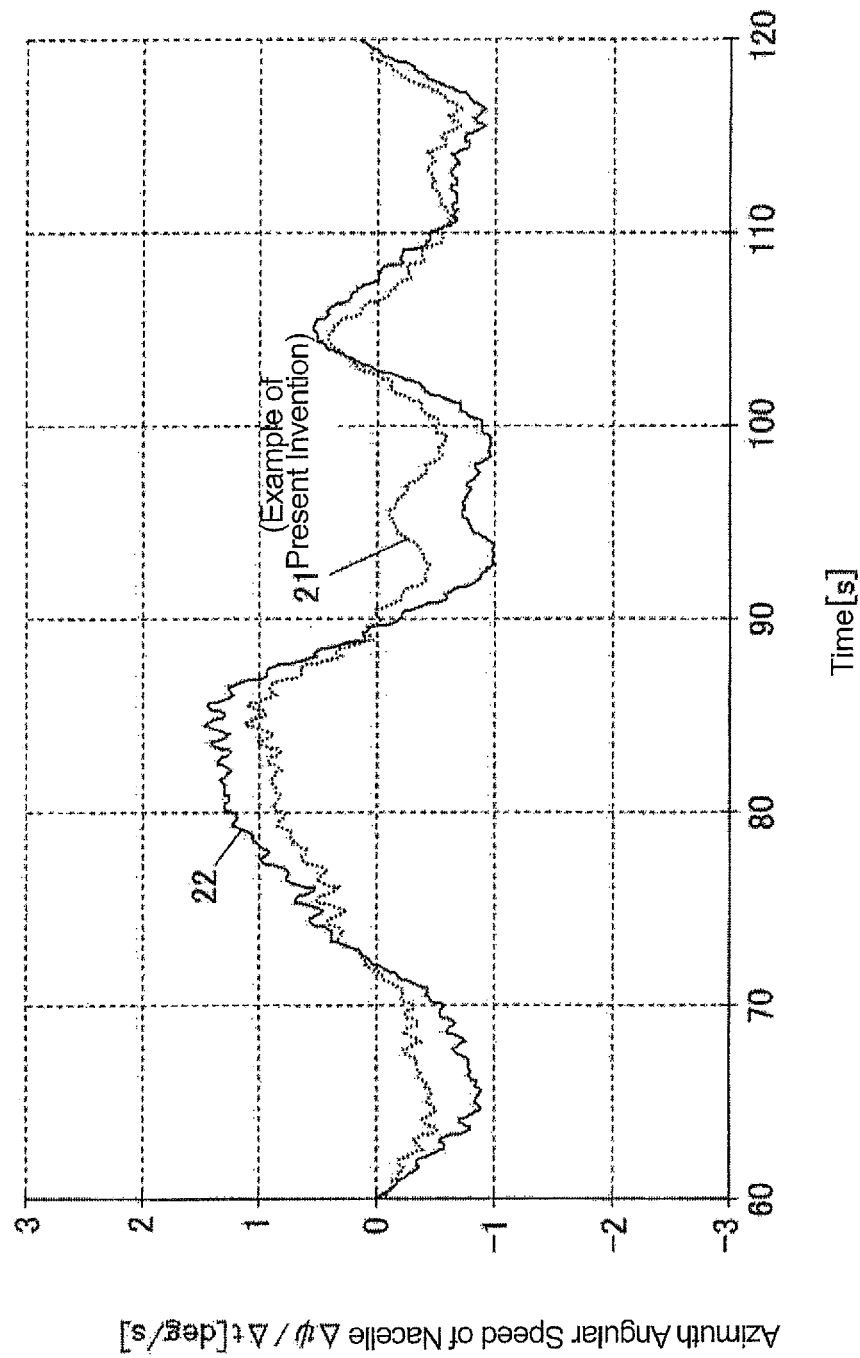
FIG. 6 is a graph illustrating the change in azimuth angular speed of the nacelle, and compares the simulation effect of applying and not applying the control of the present invention.

As illustrated in FIG. 6, it can be seen that change in the azimuth angular speed of the nacelle was suppressed by this control, and by this control, the amplitude of the line 21 in the graph is kept small when compared with the line 22 in the graph for the case in which this control was not applied.

Figure 7:
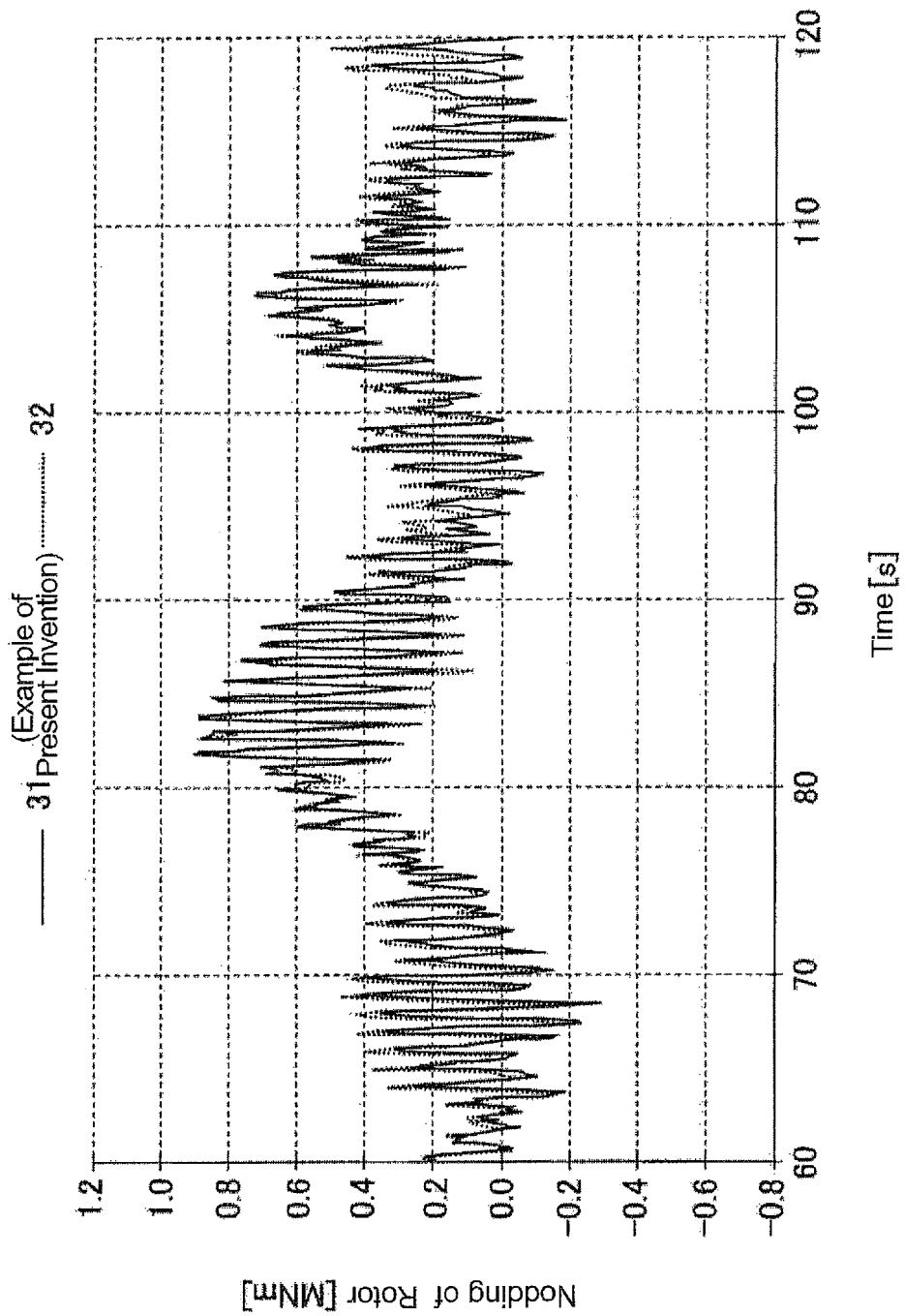
FIG. 7 is a graph illustrating the change in nodding of the rotor, and compares the simulation effect of applying and not applying the control of the present invention.

As illustrated in FIG. 7, it can be seen that nodding of the rotor was suppressed by this control, and by this control, the amplitude of the line 31 in the graph is kept small when compared with the line 32 in the graph for the case in which this control was not applied.

In the embodiment above, the present invention was applied to a horizontal axis wind turbine in which the nacelle is supported by the tower so that there is free yaw rotation, however, the present invention is not limited to this and can also be applied to a floating offshore wind turbine in which the nacelle is supported such that it is floating.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. A horizontal axis wind turbine apparatus comprising:
    a main turbine unit supporting a horizontal axis turbine rotatably around a horizontal axis, wherein the horizontal axis turbine has a plurality of blades and rotates around the horizontal axis by receiving wind;
    a tower supporting the main turbine unit pivotably in the horizontal direction, and allowing the main turbine unit to pivot in accordance with a direction of wind received by the blades;
    a pivoting position detector provided either on the main turbine unit side or on the tower side, for detecting a position of the main turbine unit in its pivoting direction;
    a blade rotation angle detector provided on the main turbine unit, for detecting a rotation angle of each of the blades in the rotational direction of the horizontal axis turbine;
    a blade pitch angle changing mechanism provided on the main turbine unit, for changing a pitch angle of each of the blades independently in a direction that increases the pitch angle or in a direction that decreases the pitch angle; and
    a pitch angle controller for controlling the blade pitch angle changing mechanism, wherein the pitch angle controller is adapted to calculate a pivoting speed of the main turbine unit based on a detected result of the pivoting position detector, and to control the blade pitch angle changing mechanism based on the pivoting speed of the main turbine unit and the rotation angle of each blade detected by the blade rotation angle detector, so as to continuously adjust the pitch angle of each blade while the horizontal axis turbine is rotating;
    wherein the pitch angle of each blade is adjusted according to a change direction of the position of the main turbine unit so that the pitch angles of blades that move to the upwind side are controlled to a fine side and the pitch angles of blades that move toward the downwind side are controlled to a feather side.

2. The horizontal axis wind turbine apparatus according to claim 1, wherein
    the pitch angle controller controls the blade pitch angle changing mechanism so that an amount of the pitch angle adjustment for each blade becomes greater as the calculated pivoting speed increases.

3. The horizontal axis wind turbine apparatus according to claim 1, wherein the pitch angle controller controls the blade pitch angle changing mechanism so that the amount of changing the pitch angle of each blade becomes the maximum when the rotation angle of each blade is around 90 degrees or 270 degrees, wherein the rotation angle of each blade is defined as 0 degrees when it is located at a highest position of the rotation direction of the horizontal axis turbine.

4. A horizontal axis wind turbine apparatus comprising:

a main turbine unit supporting a horizontal axis turbine rotatably around a horizontal axis, wherein the horizontal axis turbine has a plurality of blades and is adapted to rotate around the horizontal axis by receiving wind;

a tower supporting the main turbine unit pivotably in the horizontal direction, and allowing the main turbine unit to pivot in accordance with a direction of wind received by the blades;

a pivoting position detector provided either on the main turbine unit side or on the tower side, for detecting a position of the main turbine unit in its pivoting direction;

a blade rotation angle detector provided on the main turbine unit, for detecting a rotation angle of each of the blades in the rotational direction of the horizontal axis turbine;

a blade pitch angle changing mechanism provided on the main turbine unit, for changing a pitch angle of each of the blades independently in a direction that increases the pitch angle or in a direction that decreases the pitch angle; and a pitch angle controller for controlling the blade pitch angle changing mechanism so as to continuously adjust the pitch angle of each blade according to the rotation angle of each blade while the horizontal axis turbine is rotating;

wherein the pitch angle controller is adapted to acquire the position and the rotation angle from the pivoting position detector and the blade rotation angle detector, respectively, to calculate a rate of change of the position, to perform control so that a torque generated by the horizontal axis turbine acts in a direction opposite to a change direction of the position of the main turbine unit by setting the pitch angle to a fine side for blades that move to the upwind side according to the change direction of the position of the main turbine unit and by setting the pitch angle to a feather side for blades that move toward the downwind side according to the change direction of the position of the main turbine unit, and to calculate an amount of change of the pitch angle of each of the blades according to an increase in a rate of change of position, wherein the calculated values increase in accordance with the increase in the rate of change of the position.

* * * * *